United States Patent
Lawrey et al.

(10) Patent No.: US 6,737,497 B2
(45) Date of Patent: *May 18, 2004

(54) POLYURETHANE/UREAS USEFUL FOR THE PRODUCTION OF SPANDEX AND A PROCESS FOR THEIR PRODUCTION

(75) Inventors: Bruce D. Lawrey, Moon Township, PA (US); Thomas A. J. Gross, Wulfrath (DE); Rolf-Volker Meyer, Much (DE)

(73) Assignee: Bayer Polymers LLC, Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/158,762

(22) Filed: May 30, 2002

(65) Prior Publication Data

US 2003/0225241 A1 Dec. 4, 2003

(51) Int. Cl.$^7$ ................................................ C08G 18/10
(52) U.S. Cl. ............................ 528/61; 528/64; 528/906
(58) Field of Search ............................ 528/61, 64, 906

(56) References Cited

U.S. PATENT DOCUMENTS

| | | | |
|---|---|---|---|
| 3,180,854 A | 4/1965 | Schneider et al. | 260/77.5 |
| 3,384,623 A | 5/1968 | Inoue et al. | 260/75 |
| 3,393,243 A | 7/1968 | Cuscurida | 260/615 |
| 3,427,256 A | 2/1969 | Milgrom | 252/431 |
| 3,427,334 A | 2/1969 | Belner | 260/429 |
| 3,427,335 A | 2/1969 | Herold | 260/429 |
| 3,483,167 A | 12/1969 | Sommer et al. | 260/75 |
| 3,829,505 A | 8/1974 | Herold | 260/611 B |
| 3,941,849 A | 3/1976 | Herold | 260/607 A |
| 4,282,387 A | 8/1981 | Olstowski et al. | 568/618 |
| 4,687,851 A | 8/1987 | Laughner | 544/398 |
| 5,010,117 A | 4/1991 | Herrington et al. | 521/159 |
| 5,010,187 A | 4/1991 | Heuvelsland | 536/120 |
| 5,114,619 A | 5/1992 | Heuvelsland | 252/182.27 |
| 5,340,902 A | 8/1994 | Smith et al. | 528/61 |
| 5,691,441 A | 11/1997 | Seneker et al. | 528/61 |

OTHER PUBLICATIONS

Polyurethane Handbook, (Gunther Oertel, Ed., Carl Hanser Verlag Pub., Munich, (month unavailable) 1985, Reactants, p. 578, Polyurethane Elastomeric Fibers.

*Primary Examiner*—Rachel Gorr
(74) *Attorney, Agent, or Firm*—Joseph C. Gil; Lyndanne M. Whalen

(57) ABSTRACT

Segmented polyurethane/ureas useful in the production of spandex are produced by chain extending an isocyanate-terminated prepolymer with a diamine chain extender that includes: (1) from about 7 to 25 equivalent percent of an asymmetric aliphatic and/or cycloaliphatic diamine and (2) a linear diamine such as ethylene diamine in the presence of a solvent. The isocyanate-terminated prepolymer is produced by reacting a stoichiometric excess of an isocyanate with an isocyanate-reactive component that includes: (1) from about 10 to about 70 equivalent percent of a polyoxypropylene diol having a molecular weight in excess of 1500 Da and an average unsaturation level no greater than about 0.03 meq/g and (2) from about 30 to about 90 equivalent percent of a polytetramethylene ether glycol having a molecular weight of at least 600 Da.

15 Claims, No Drawings

POLYURETHANE/UREAS USEFUL FOR THE PRODUCTION OF SPANDEX AND A PROCESS FOR THEIR PRODUCTION

FIELD OF THE INVENTION

The present invention relates to segmented polyurethane/ureas having excellent elasticity, mechanical and thermal properties, to fibers made with such polyurethane/ureas and to processes for the production of such polyurethane/ureas and fibers. More particularly, the present invention pertains to polyurethane/ureas and spandex fibers made from isocyanate-terminated prepolymers derived from a mixture of a polytetramethylene ether glycol (PTMEG) and a low unsaturation, high molecular weight polyoxyalkylene diol by chain extending the prepolymer with a linear diamine and at least one asymmetric aliphatic and/or cycloaliphatic diamine.

BACKGROUND OF THE INVENTION

Polyurethane/ureas having elastomeric characteristics in the forms of fibers and films have found wide acceptance in the textile industry. The term "spandex", often used to describe these elastomeric polyurethane/ureas, refers to long chain synthetic polymers made up of at least 85% by weight of segmented polyurethane. The term "elastane" is also used (e.g., in Europe) to describe these polymers. Spandex is used for many different purposes in the textile industry, especially in underwear, form-persuasive garments, bathing wear, and elastic garments or stockings. The elastomeric fibers may be supplied as core spun elastomer yarns spun round with filaments or staple fiber yarns or as a staple fiber in admixture with non-elastic fibers for the purpose of improving the wearing qualities of fabrics which are not in themselves highly elastic.

In the past, thread made of natural rubber was the only material available to provide elasticity to fabrics. Spandex, originally developed in the 1950s, has numerous advantages over such rubber filaments. The most important of these is its higher modulus. Typically, for a given denier, spandex has at least twice the recovery, or retractive power, of rubber. This enables stretch garments to be manufactured with less elastic fiber and thus be lighter in weight. Additional advantages over natural rubber include the ability to obtain spandex in much finer deniers, higher tensile strength and abrasion resistance, and in many cases, higher resilience. Additionally, spandex exhibits improved resistance to many cosmetic oils, to solvents (for example, those used in dry cleaning), and a high resistance to oxidation and ozone as well. Furthermore, in contrast to rubber filaments, spandex fibers can be dyed relatively easily with certain classes of dyestuffs.

Preparation of polyurethane elastomers by the polyaddition process from high molecular weight, substantially linear polyhydroxyl compounds, polyisocyanates and chain lengthening agents which have reactive hydrogen atoms by reaction in a highly polar organic solvent is known. The formation of fibers, filaments, threads, and films from these solvent-borne polyurethane elastomers and by reactive spinning is also known. See, e.g., U.S. Pat. Nos. 3,483,167 and 3,384,623 which disclose preparation of spandex fibers from isocyanate-terminated prepolymers prepared with polymeric diols.

Spandex made with PTMEG-derived prepolymers and polymers does not have the elongation or the low hysteresis of natural rubber but it is characterized by improved retractive power, higher tensile strength and the ability to better withstand oxidative aging. These improved features have made PTMEG-derived spandex the industry standard, despite the difficulties associated with PTMEG-derived prepolymers and polymers, and the relatively high cost of PTMEG itself.

For the reasons discussed above, the commercially preferred polymeric diol is polytetramethylene ether glycol (PTMEG). PTMEG is a solid at room temperature and produces prepolymers, particularly, diphenylmethane diisocyanate ("MDI") prepolymers having extremely high viscosities.

However, despite the inherent difficulties of handling PTMEG, its high cost and the unsatisfactory hysteresis of fibers made with PTMEG, PTMEG continues to be the mainstay of spandex production because, to date, no satisfactory substitute has been found.

One potential substitute for PTMEG which has been evaluated is polyoxypropylene glycol ("PPG") which, in principle, could be used to prepare spandex fibers. Preparation of spandex fibers from a prepolymer made with a polyol component composed primarily of PPG is attractive from an economic point of view because the cost of PPG is significantly lower than that of PTMEG. In addition, fiber prepared from prepolymers made with PPGs exhibit excellent elongation and retractive or holding power. PPGs are inherently easier to handle than PTMEG because they are non-crystallizable, relatively low viscosity liquids with low pour points. By contrast, PTMEGs are typically solids at 20 to 40° C. depending on the grade.

U.S. Pat. No. 3,180,854, for example, discloses a polyurethane/urea fiber based on a prepolymer made with a 2000 Da molecular weight polyoxypropylene glycol. However, the properties of polyoxypropylene-derived spandex fibers are generally inferior to those of fibers based on PTMEG. Consequently, polyoxypropylene glycols have not been utilized commercially in spandex production. See, e.g., the POLYURETHANE HANDBOOK (Gunther Oertel, Ed., Carl Hanser Verlag Pub., Munich 1985, p. 578) which states: "Polypropylene glycols have so far been used as soft segments only in experimental products since they produce inferior elastanes". (at page 578)

High molecular weight polyoxypropylene glycols made by conventional processes contain high percentages of terminal unsaturation or monofunctional hydroxyl-containing species ("monol"). The monol is believed by many to act as a chain terminator, limiting the formation of the required high molecular weight polymer during chain extension and yielding products which are generally inferior in comparison to PTMEG-derived elastomers.

The majority of polyoxyalkylene polyether polyols are polymerized in the presence of a pH-basic catalyst. For example, polyoxypropylene diols are prepared by the base catalyzed oxypropylation of a difunctional initiator such as propylene glycol. During base catalyzed oxypropylation, a competing rearrangement of propylene oxide to allyl alcohol continually introduces an unsaturated, monofunctional, oxyalkylatable species into the reactor. The oxyalkylation of this monofunctional species yields allyl-terminated polyoxypropylene monols. The rearrangement is discussed in BLOCK AND GRAFT POLYMERIZATION, Vol. 2, Ceresa, Ed., John Wiley & Sons, pp. 17–21.

Unsaturation is measured in accordance with ASTM D-2849-69 "Testing Urethane Foam Polyol Raw Materials," and expressed as milliequivalents of unsaturation per gram of polyol (meq/g).

Due to the continual formation of allyl alcohol and its subsequent oxypropylation, the average functionality of the polyol mixture decreases and the molecular weight distribution broadens. Base-catalyzed polyoxyalkylene polyols contain considerable quantities of lower molecular weight, monofunctional species. In polyoxypropylene diols of 4000 Da molecular weight, the content of monofunctional species may lie between 30 and 40 mol percent. In such cases, the average functionality is lowered to approximately 1.6 to 1.7 from the nominal, or theoretical functionality of 2.0. In addition, the polyols have a high polydispersity, $M_w/M_n$ due to the presence of a substantial amount of low molecular weight fractions.

Lowering unsaturation and the attendant large monol fraction in polyoxypropylene polyols has been touted as a means for production of polyurethane elastomers having improved properties. For example, use of polyols having a low content of monofunctional species has been suggested as a method for increasing polymer molecular weight; and increased polymer molecular weight has, in turn, been cited as desirable in producing higher performance polymers.

Reducing unsaturation in polyoxyalkylene polyols by lowering catalyst concentration and decreasing the reaction temperature is not feasible because even though low unsaturation polyols may be prepared, the reaction rate is so slow that oxypropylation takes days or even weeks. Thus, efforts have been made to discover catalysts capable of producing polyoxypropylated products in a reasonable amount of time without introducing monofunctionality due to allylic species.

In the early 1960's, double metal cyanide catalysts such as zinc hexacyano-cobaltate complexes were developed to accomplish this objective. Such complexes are disclosed in U.S. Pat. Nos. 3,427,256; 3,427,334; 3,427,335; 3,829,505; and 3,941,849. Although the unsaturation level is lowered to approximately 0.018 meq/g, the cost of these catalysts coupled with the need for lengthy and expensive catalyst removal steps prevented commercialization of processes for the production of polyoxyalkylene polyols using these catalysts.

Other alternatives to basic catalysts such as cesium hydroxide and rubidium hydroxide are disclosed in U.S. Pat. No. 3,393,243. Barium and strontium oxide and hydroxide catalysts (disclosed in U.S. Pat. Nos. 5,010,187 and 5,114,619) enabled modest improvements with respect to unsaturation levels. However, catalyst expense, and in some cases, toxicity, and the modest level of improvement attributable to these catalysts, mitigated against their commercialization. Catalysts such as calcium naphthenate and combinations of calcium naphthenate with tertiary amines have proven to be useful in preparing polyols with unsaturation levels as low as 0.016 meq/g, and more generally in the range of from 0.02 to 0.04 meq/g. (See, e.g., U.S. Pat. Nos. 4,282,387; 4,687,851; and 5,010,117.)

In the 1980's, use of double metal cyanide complex (DMC) catalysts was revisited. Improvements in catalytic activity and catalyst removal methods encouraged commercial use of DMC catalyzed polyols having low unsaturation levels (in the range of from 0.015 to 0.018 meq/g) commercially for a brief time. However, base catalysis continued to be the primary method used to produce polyoxypropylene polyols. pH-basic catalysts continue to be the catalysts which are primarily used in commercial polyoxyalkylene polyol production processes.

Major advances in DMC catalysts and polyoxyalkylation processes have enabled preparation of ultra-low unsaturation polyoxypropylene polyols on a commercial scale. High molecular weight polyols (molecular weight in the 4000 Da to 8000 Da range) typically exhibit unsaturation levels in the range of from 0.004 to 0.007 meq/g when catalyzed by these improved DMC catalysts. At these levels of unsaturation, only 2 mol percent or less of monofunctional species is present. GPC analysis of these polyols shows them to be virtually monodisperse, often exhibiting polydispersities of less than 1.10. Several such polyols have recently been commercialized as ACCLAIM™ polyols.

U.S. Pat. No. 5,340,902 discloses that unsaturation levels of less than 0.03 milliequivalents/g are beneficial in the production of spandex fibers but does not provide any examples which illustrate use of polyols having unsaturation levels of less than 0.03 meq/g in the production of spandex fibers. U.S. Pat. No. 5,691,441 discloses that blends of low monol polyols with unsaturation levels of less than 0.010 meq/g are needed to achieve the benefits of the disclosed invention.

U.S. Pat. No. 5,691,441 teaches that "The ultra-low unsaturation polyols have been found to be quantitatively different than both conventional polyols and low unsaturation polyols". In view of this teaching, it would be expected that the properties of spandex made with blends of PTMEG and polyoxypropylene diols having relatively high levels of unsaturation (greater than 0.010 meq/g) would have properties which are markedly inferior to those of fibers based on blends of PTMEG and polyoxypropylene diols containing ultra-low levels of unsaturation (i.e., less than 0.010 meq/g). U.S. Pat. No. 5,691,441 also teaches that "ethylene diamine as the sole chain extender is particularly preferred".

SUMMARY OF THE INVENTION

It is an object of the present invention to provide polyurethane/ureas useful for the production of spandex fibers which are made from a significant amount of PPG and have physical properties comparable to those of spandex fibers made with 100% PTMEG.

It is another object of the present invention to provide a process for the production of polyurethane/ureas and spandex fibers made from such polyurethane/ureas in which the advantageous physical properties of fiber made with PTMEG are achieved and the prepolymer viscosity and fiber hysteresis are reduced.

It is a further object of the present invention to provide polyurethane/ureas and spandex fibers made from such polyurethane/ureas which are based in part on less expensive and easier to handle polyoxypropylene glycols and which exhibit improved properties as compared to spandex fibers made solely with PTMEG.

It is also an object of the present invention to provide spandex fibers and a process for making spandex fibers characterized by excellent tenacity, elongation, retractive power, and set.

These and other objects which will be apparent to those skilled in the art are achieved by chain extending an isocyanate-terminated prepolymer which has been produced from an isocyanate-reactive component satisfying specified criteria with a chain extender component that includes: (1) from about 7 to 25 equivalent percent of an asymmetric aliphatic and/or cycloaliphatic diamine and (2) a linear diamine such as ethylene diamine. The isocyanate-reactive component includes: (1) at least one PTMEG and (2) at least one polyoxypropylene glycol having a molecular weight greater than about 1500 Da and an unsaturation level less than or equal to 0.03 meq/g. The elastomer thus obtained is then spun into fiber.

DESCRIPTION OF THE PREFERRED EMBODIMENTS OF THE INVENTION

The present invention is directed to polyurethane/ureas suitable for use in the production of spandex fibers, to spandex fibers produced from these polyurethane/ureas and to processes for the production of such polyurethane/ureas and spandex fibers.

The polyurethane/ureas of the present invention are prepared from isocyanate-terminated prepolymers. Suitable prepolymers are produced by reacting an isocyanate-reactive component which is generally composed of diols with an excess of a diisocyanate. The isocyanate-terminated prepolymers typically used to produce this type of elastomer have a relatively low isocyanate content. Isocyanate contents of from about 1 to about 3.75 are preferred. Particularly preferred prepolymers have isocyanate contents of from 2–3.5%. The prepolymer is then chain extended in solution.

It has surprisingly been found that spandex systems based on an isocyanate-reactive component which is a blend of PPG and PTMEG produce fibers with acceptable mechanical properties even if the PPG component has an unsaturation level as high as 0.030 meq/g if the chain extender component of the present invention is used. Contrary to what is taught in the prior art, spandex fibers with excellent mechanical properties are obtained even with a PPG component having unsaturation levels greater than 0.010 meq/g if a chain extender component which includes from about 7 to about 25 equivalent percent of an asymmetric aliphatic and/or cycloaliphatic diamine and a linear diamine (e.g., ethylene diamine) is used.

A key feature of the present invention is the use of a chain extender component which includes at least one asymmetric aliphatic and/or cycloaliphatic diamine and at least one linear diamine to chain extend the isocyanate-terminated prepolymer. The asymmetric aliphatic and/or cycloaliphatic diamine should be present in an amount of from about 7 to about 25 equivalent percent, based on total equivalents of chain extender component, preferably from about 7 to about 20 equivalent percent, most preferably, from about 10 to about 15 equivalent percent. The remainder of the chain extender component is linear diamine.

Examples of suitable asymmetric aliphatic and/or cycloaliphatic chain extenders include: 1,2 diaminopropane; isophorone diamine; methyl-1,3-diaminocyclo-hexane; 1,3-diaminocyclohexane; 2-methyl-pentamethylenediamine (commercially available from DuPont under the name Dytek A); 1,4-diamino-2-methylpiperazine; 1,4-diamino-2,5-dimethylpiperazine; and methyl bis-propylamine.

Examples of suitable linear amine chain extenders include: ethylene diamine; hydrazine; 1,3-propylene diamine; and tetramethylene diamine. Ethylene diamine is most preferred.

Any of the known aliphatic and/or aromatic diisocyanates may be used to produce the isocyanate-terminated prepolymers employed in the present invention. Preferred isocyanates include: linear aliphatic isocyanates such as 1,2-ethylene diisocyanate, 1,3-propylene diisocyanate, 1,4-butylene diisocyanate, 1,6-hexylene diisocyanate, 1,8-octylene diisocyanate, 1,5-diisocyanato-2,2,4-trimethylpentane, 3-oxo-1,5-pentane diisocyanate, and the like; cycloaliphatic diisocyanates such as isophorone diisocyanate, the cyclohexane diisocyanates, preferably 1,4-cyclohexane diisocyanate, fully hydrogenated aromatic diisocyanates such as hydrogenated tetramethylxylylene, diisocyanate, hydrogenated toluene diisocyanates, and hydrogenated methylene diphenylene diisocyanates; and aromatic diisocyanates such as the toluene diisocyanates, particularly the 2,4-isomer, the methylene diphenylene diisocyanates, particularly 4,4'-methylene diphenylene diisocyanate (4,4'-MDI), tetramethylxylylene diisocyanate, and the like. 4,4'-MDI is particularly preferred.

The isocyanate-reactive component used to prepare the isocyanate-terminated prepolymers includes: (1) at least one high molecular weight, low unsaturation polyoxypropylene polyol and (2) at least one PTMEG.

The unsaturation level of the high molecular weight polyoxy-propylene polyol component employed in the present invention must be less than or equal to 0.03 meq/g. Most preferably, the entire amount of high molecular weight polyoxyalkylene polyol present in the polyol component has an unsaturation level of less than 0.03 meq/g, more preferably less than 0.02 meq/g, and most preferably less than 0.015 meq/g. However, it is within the scope of the present invention to include a minor portion of high molecular weight polyoxypropylene polyol which has a somewhat higher unsaturation level.

As used herein, the term "low unsaturation polyoxypropylene polyol (or glycol)," means a polymer glycol prepared by oxypropylating a dihydric initiator with propylene oxide in the presence of a catalyst in a manner such that the total unsaturation of the polyol product is less than or equal to 0.03 meq/g.

The polyoxypropylene glycol may contain oxyethylene moieties distributed randomly or in block fashion. If the oxyethylene moieties are contained in a block, the block is preferably a terminal block. However, randomly distributed oxyethylene moieties are preferred when such moieties are present. In general, the polyoxypropylene glycol should contain no more than about 30 weight percent of oxyethylene moieties, preferably no more than 20 percent, and more preferably no more than about 10 percent. The polyoxypropylene glycol may also contain higher alkylene oxide moieties such as those derived from 1,2- and 2,3-butylene oxide and other higher alkylene oxides, or oxetane. The amount of such higher alkylene oxides may be as much as 10–30% by weight of the polyoxypropylene polyol. However, preferably, the polyoxypropylene polyol is substantially derived from propylene oxide or propylene oxide in admixture with minor amounts of ethylene oxide. All such glycols containing a major portion of oxypropylene moieties are considered polyoxypropylene glycols as that term is used herein.

The high molecular weight, low unsaturation polyoxypropylene glycols useful in the practice of the present invention will generally have a molecular weight of at least about 1500 Da, preferably at least about 2000 Da, and may range up to 20,000 Da or higher. It is particularly preferred that the molecular weight be in the range of from about 3000 Da to about 8,000 Da, and most preferably be in the range of from about 4000 Da to about 8000 Da.

"Molecular weight(s)" and "equivalent weight(s)" as used herein are expressed in Da (Daltons) and are the number average molecular weight(s) and number average equivalent weight(s), respectively, unless specified otherwise.

The number average molecular weight for each polyether glycol is determined from the hydroxyl number of the polyether glycol as measured by the imidazole-pyridine catalyst method described by S. L. Wellon et al., "Determination of Hydroxyl Content of Polyurethane Polyols and Other Alcohols", ANALYTICAL CHEMISTRY, Vol. 52, NO. 8, pp. 1374–1376 (July 1980).

It is, of course, possible to use a blend of more than one high molecular weight polyoxypropylene polyol, or to add low molecular weight diols in a minor i.e., up to 10% by weight quantity. However, when such blends are used, the average molecular weight of the blend of high molecular weight components should be at least 1500 Da.

Preferably, the prepolymers are prepared from substantially all difunctional polyols, particularly those which are polyoxypropylene glycol-derived. The term "polyoxypropylene glycol" as used herein includes a minor amount, i.e., up to about 5 weight percent or more of a triol.

The polytetramethylene ether glycol (PTMEG) used to make the polyurethane/urea elastomers of the present invention has a molecular weight greater than 600 Da, preferably from about 600 to about 6,000 Da, most preferably from about 600 to about 3,000 Da.

The PTMEG may be prepared by any of the known methods. One suitable method is the polymerization of tetrahydrofuran in the presence of a Lewis acid catalyst. Suitable polymerization catalysts include anhydrous aluminum chloride and boron trifluoride etherate. Such catalysts are well known and are the subject of numerous patents and publications. PTMEG polyols are commercially available in a variety of molecular weights from numerous sources. For example, DuPont sells PTMEG polyols under the trademark Terathane®. BASF Corporation sells PTMEG polyols under the designation PolyTHF. Penn Specialty Chemicals, Inc. sells such polyols under the trademark POLYMEG®.

The isocyanate-reactive component, preferably, a polyol component used to produce the prepolymer from which the spandex fibers of the present invention are produced is predominantly a diol component, i.e., the diol component is preferably from about 30 equivalent percent to about 90 equivalent percent PTMEG, and more preferably from about 50 equivalent percent to about 90 equivalent percent PTMEG, the remainder of the diol component preferably being a polyoxypropylene diol component having an average unsaturation no greater than about 0.03 meq/g, preferably less than about 0.02 meq/g, and most preferably less than about 0.015 meq/g.

However, it should be noted that polyoxypropylene diols having unsaturation levels greater than 0.03 meq/g may be included in the polyol component used to produce the prepolymers of the present invention provided that the overall average unsaturation level of the total polyoxyalkylene portion of the polyol component is about 0.03 meq/g or lower.

The diol component used in the practice of the present invention includes: (1) one or more PTMEG diols, and (2) one or more polyoxy-alkylene diols having an average unsaturation level in the polyoxyalkylene diol portion of the diol component of no more than about 0.03 meq/g. The polyol component used to make prepolymers suitable for use in the practice of the present invention includes this diol component and may also include minor amounts of any other hydroxyl or other reactive species which, together with the diol component, will form an isocyanate-terminated prepolymer when reacted with the isocyanate component.

The isocyanate-reactive component is reacted with an excess of the desired diisocyanate, preferably under an inert atmosphere or under vacuum at slightly elevated temperature, i.e., between 50° C. and 100° C., more preferably between 60° C. and 90° C. In the embodiment of the invention in which the prepolymer is formed in the presence of at least 10% dimethylacetamide, lower temperatures (i.e., temperatures in the range of from about 50 to about 60° C.) may be used to obtain a prepolymer having a desirable viscosity. The amount of excess isocyanate is selected so as to provide a % NCO group content in the prepolymer of between about 1.0 weight percent and 3.75 weight percent, preferably between about 2 and 3.5 weight percent.

The reaction of the isocyanate with the polyol and any other isocyanate-reactive materials may be catalyzed with any of the catalysts known to promote the reaction of isocyanate and hydroxyl amine groups, but the reaction may also take place without the use of a catalyst. In a preferred embodiment of the invention, a catalyst which promotes linear polymerization but does not degrade the polymer such as a metal salt of a $C_6$–$C_{20}$ monocarboxylic acid or naphthenic acid is included in the prepolymer-forming mixture. Zinc octoate and calcium octoate are particularly preferred catalysts.

In general, the reaction of the polyol and isocyanate components proceeds until the point at which the isocyanate content becomes constant.

The isocyanate-terminated prepolymer is then dissolved in a solvent, generally, a polar aprotic solvent such as dimethyl acetamide, dimethyl formamide, dimethyl sulfoxide, N-methylpyrrolidone, or the like, and then chain-extended with the chain extender component of the present invention.

The term "polar aprotic solvent" as used herein means a solvent having the capability to dissolve the chain extended polyurethane at the desired concentration while being essentially non-reactive to isocyanate groups.

The polyurethane/urea thus obtained has both hard and soft segments. The terms "soft segment" and "hard segment" refer to specific portions of the polymer chains. The soft segments are the polyether-based portions of the segmented polyurethane/urea polymer, derived from the PTMEG and the polyoxypropylene glycol. The hard segments are those portions of the polymer chains that are derived from the diisocyanate and chain extender. The term "NCO content" refers to the isocyanate group content of the prepolymer, before chain extension.

A chain terminator is generally included in the reaction mixture to adjust the final molecular weight, and thus the intrinsic viscosity, of the polyurethane/urea polymer to the desired value. Usually, the chain terminator is a monofunctional compound such as a secondary amine (e.g., diethylamine or dibutylamine).

Any of the processes for producing spandex polymers known to those skilled in the art may be used to produce the polyurethane/urea elastomers and spandex fibers of the present invention. Such processes are disclosed, for example, in U.S. Pat. Nos. 3,384,623; 3,483,167; and 5,340,902, which are herein incorporated by reference.

Having generally described this invention, a further understanding can be obtained by reference to certain specific examples which are provided herein for purposes of illustration only and are not intended to be limiting unless otherwise specified.

EXAMPLES

Measuring Methods

The properties of the spandex materials produced in the Examples were determined as follows:

(1) The intrinsic viscosities η of the elastomers were measured in dilute solution having a concentration c of 0.5 g/100 ml dimethyl acetamide at 30° C. by determination of the relative viscosity $\eta_r$ against the pure solvent and were converted in accordance with the following equation:

$$\eta_r = t_1/t_0$$

where:

$t_1$ is the throughflow time (sec) of the polymer solution
$t_0$ is the throughflow time (sec) of the pure solvent $$\eta = (Ln\eta_r)/c$$

(2) Tenacity and elongation were determined in accordance with DIN 53 815 (cN/dtex).
(3) The set or residual elongation was determined after 5×300% elongation with a recovery period of 60 seconds in between. Set is a measure of the fiber's ability to be stretched and then return to its original length. Any excess length is measured as percent set or residual elongation, and low values are desirable. Typical percent sets of PTMEG-derived spandex fibers are less than 30 percent, preferably less than 25 percent.

The materials used in the Examples were as follows:

| | |
|---|---|
| POLYOL A: | A propylene oxide-based diol having a number average molecular weight of 4,000 and an unsaturation level of 0.005 meq/g. |
| POLYOL B: | Polytetramethylene ether glycol having a number average molecular weight of 1,000. |
| POLYOL C: | A blend composed of 40% by weight of a polyoxypropylene diol having a molecular weight of 4000 Da and an unsaturation level of 0.005 meq/g (prepared with a double metal cyanide catalyst) and 60% by weight of a polyoxypropylene diol having a molecular weight of 4000 Da and an unsaturation level of 0.030 meq/g (prepared with a cesium hydroxide catalyst). The overall blend had a molecular weight of 4000 Da and an average unsaturation level of 0.020 meq/g. |
| POLYOL D: | A polyoxypropylene diol having a molecular weight of 2000 Da and an unsaturation level of 0.005 meq/g. |
| POLYOL E: | A polytetramethylene ether glycol having a number average molecular weight of 2,000. |
| MDI: | 4,4'-diphenylmethane diisocyanate. |
| ZNO: | Zinc octoate (8% zinc octoate in dimethylacetamide). |
| DMAc: | Dimethylacetamide. |
| EDA: | Ethylene diamine. |
| IPDA: | Isophorone diamine. |
| DEA: | Diethylamine. |
| 1,2-PDA: | 1,2-propylene diamine. |
| M-DACH: | Methyl-1,3-diamino cyclohexane. |
| DYTEK: | 2-methyl-pentamethylenediamine. |

Examples 1–2

A blend of 1721.5 g of POLYOL A and 1176 g of POLYOL B was dehydrated in a vacuum for 1 hour at 120° C. After cooling to room temperature, 50 ppm of ZNO were mixed into the blend. 724.4 g of MDI were added at 55° C. The reaction mixture was heated for 90 minutes at 80° C. until the prepolymer had an NCO content of 3.04%.

At 60° C., 1553.0 g of DMAc were added to the prepolymer and the mixture was cooled to 25° C. The homogenized mixture of prepolymer and DMAc had an NCO content of 2.00%. The diluted prepolymer was divided into 2 portions:

First Portion (EXAMPLE 1): 21.81 g of EDA, 11.10 g IPDA, 0.95 g DEA and 2348 g DMAc were added to 1702 g of the diluted prepolymer with rapid mixing. After one hour of mixing, the resulting solution had a viscosity of 30.8 Pa·s. An additional 65.4 g of the diluted prepolymer were added and allowed to mix for 30 minutes. At this point, the solution had a viscosity of 57 Pa·s. An additional 43.1 g of diluted prepolymer were added and allowed to mix for 30 minutes. This resulted in a final solution having a viscosity of 82 Pa·s, a solids content of approximately 30%, and an intrinsic viscosity of 1.22 dL/g.

Second Portion (Example 2-COMPARATIVE): 25.85 g of EDA, 0.96 g DEA, and 2342 g of DMAc were added to 1709.5 g of the diluted prepolymer with rapid mixing. After one hour of mixing, the resulting solution had a viscosity of 43.6 Pa·s. An additional 65.6 g of the diluted prepolymer were added and allowed to mix for 30 minutes. This resulted in a final solution having a viscosity of 72.0 Pa·s, a solids content of approximately 30%, and an intrinsic viscosity of 1.15 dL/g.

0.3% by weight Mg stearate, 2.0% by weight Cyanox® 1790 anti-oxidant (commercially available from Cyanamid), 0.5% by weight Tinuvin® 622 stabilizer (commercially available from Ciba-Geigy), and 0.3% by weight of the polyether siloxane Silwet® L7607 (a product of Union Carbide Corp., USA) were added to the viscous polymer solutions (quantities based on polyurethane solids). The solutions were then dry spun to form 40 denier fibers.

The relative amounts of materials used and the properties of the polymer solution and of the fibers made with the solution are reported in TABLE 1.

Example 3

Comparative Example 4

The procedure used in Example 1 and Comparative Example 2 was repeated using POLYOL C. The relative amounts of materials used and the properties of the polymer solution and of the fibers made from the solution are reported in TABLE 1.

Comparative Example 5

The procedure used in Comparative Example 2 was repeated using POLYOL D. The relative amounts of materials used and the properties of the polymer solution and of the fibers made from the solution are reported in TABLE 1.

TABLE I

| Example | 1 | 2* | 3 | 4* | 5* |
|---|---|---|---|---|---|
| POLYOL | A | A | C | C | D |
| Equivalent % | 27 | 27 | 27 | 27 | 100 |
| Weight % | 59.4 | 59.4 | 59.7 | 59.7 | 100 |
| POLYOL | B | B | B | B | — |
| Equivalent % | 73 | 73 | 73 | 73 | 0 |
| Weight % | 40.6 | 40.6 | 40.3 | 40.3 | 0 |

TABLE I-continued

| Example | 1 | 2* | 3 | 4* | 5* |
|---|---|---|---|---|---|
| POLYOL Blend Molecular Weight | 1800 | 1800 | 1800 | 1800 | 2000 |
| NCO:OH | 1.8 | 1.8 | 1.8 | 1.8 | 1.8 |
| Prepol. Viscosity, Pa · s (50° C.) | 10.6 | 10.6 | 10.4 | 10.4 | 5.8 |
| ZNO | 50 ppm | 50 ppm | 50 ppm | 50 ppm | 50 ppm |
| Amines: | | | | | |
| EDA, mole % | 83.5 | 98.5 | 84.0 | 99.0 | 99.0 |
| IPDA, mole % | 15 | 0 | 15 | 0 | 0 |
| DEA, mole % | 1.5 | 1.5 | 1.0 | 1.0 | 1.0 |
| Polymer Solution: | | | | | |
| % Solids | 30 | 30 | 30 | 30 | 30 |
| Polymer Solution Viscosity @ 50° C., Pa · s | 64 | 43 | 41 | 37 | 57 |
| Spinning Speed (m/min.) | 420 | 420 | 420 | 420 | 420 |
| Fiber properties: | | | | | |
| Tenacity (cN/dtex) | 1.21 | 0.96 | 1.16 | 0.68 | 0.50 |
| Actual Tenacity[1] (cN/dtex) | 8.10 | 7.15 | 8.15 | 5.55 | 4.13 |
| % Elongation | 569 | 643 | 599 | 720 | 727 |
| 400% Modulus, cN/dtex | 0.282 | 0.215 | 0.295 | 0.173 | 0.161 |
| 5th Cycle Unload Power @ 150%, cN/dtex | 0.021 | 0.020 | 0.022 | 0.017 | 0.016 |
| Set, % | 26 | 34 | 31 | 43 | 44 |

*Comparative Example
[1]Actual Tenacity = Tenacity calculated on the basis of actual denier at break.

The data presented in TABLE 1 with respect to the fibers produced in Comparative Example 5 shows that a 2000 Da ultra-low unsaturation diol-derived spandex had much lower tenacity and retractive power, and an unacceptable set as compared to a spandex prepared according to the invention. While the spandex of Comparative Example 5 had a tenacity of 0.5 cN/dtex, a tenacity of at least about 0.85 cN/dtex is generally needed for a fiber to be commercially viable.

It is evident from the data presented in TABLE 1 with respect to Comparative Examples 2 and 4 that tenacity is very sensitive to variations in unsaturation. In Comparative Example 2, the PPG portion of the polyol component had an unsaturation level of 0.005 meq/g and produced fibers having a tenacity of 0.96 cN/dtex. A 30% lower tenacity was obtained in Comparative Example 4 when the PPG portion of the polyol component used to prepare the polyurethane/urea polymer had an unsaturation level of 0.020 meq/g. In addition, the higher unsaturation level gave rise to a very large set value (43%) and a decrease in unload or retractive power, both of which results are undesirable. Surprisingly, in the case of Examples 1 and 3, where a chain extender component of the present invention was used, the spandex exhibited substantially superior tenacity, unload power, and set values relative to Comparative Examples 2 and 4 in which no asymmetric diamine chain extender was used.

The effect of the chain extender component upon fiber properties is further illustrated in Example 3 and Comparative Example 4 in which the polyol component was the same but the chain extender component was different. The tenacity of the fibers produced in Example 3 had a tenacity 170% greater than that of the fibers produced in Comparative Example 4. Further, because POLYOL C is a blend which includes 60 wt. % of polyol (prepared with cesium hydroxide) having an unsaturation level of 0.030 meq/g, the results achieved in Example 3 suggest that the method by which the polyol is prepared may not be as significant as previously believed. More specifically, the teachings in the literature would lead one skilled in the art to expect that use of polyols produced from a catalyst such as cesium hydroxide having an unsaturation level of 0.030 meq/g would adversely affect the physical and mechanical properties of fibers produced with such polyols. Contrary to this expectation, fibers having excellent physical and mechanical properties were prepared from such a polyol using the chain extender component of the present invention.

It is also important to note that despite a four-fold difference in the unsaturation level of the PPG portion of the polyol component used in Examples 1 and 3, the properties of the fibers produced in those examples were almost the same when the diamine chain extender component of the present invention was used. This is surprising in light of the teachings in the patent literature (See, e.g., U.S. Pat. Nos. 5,691,441 and 5,708,118) that only truly ultra-low unsaturation polyols (<0.010 meq/g) are suitable for the production of spandex.

If, as has been taught in the patent literature, the mechanical properties of spandex fibers suffer as unsaturation increases, it would be expected that fibers having substantially different properties would be obtained when polyols having significantly different unsaturation levels are used to produce the fibers. Contrary to this expectation, it has been found that fibers having substantially the same physical and mechanical properties are obtained from such different polyols when the chain extender component of the present invention is used.

Examples 6–12

The prepolymer and fibers of Comparative Example 6 and of Example 7 were prepared by the same procedure as was used in Examples 1 and 2 using the materials listed in TABLE 2 in the amounts indicated in TABLE 2.

The following procedure was used in Examples 9, 10, 11, 12 and comparative Example 8. A single 73 kg batch of prepolymer was prepared from MDI, POLYOL D and POLYOL E in the relative amounts indicated in TABLE 2 in an autoclave reactor. The prepolymer was diluted with DMAc and reacted in a continuous mechanical polymerizer with a DMAc/amine stream in order to obtain solutions having the compositions and characteristics listed in TABLE 2. On an equivalents basis, there was a 2% excess of amine groups relative to NCO groups. The solutions were then dry spun to form 40 denier fibers.

from a polyol component of the same composition if a standard, linear aliphatic diamine (e.g., ethylene diamine) is used in combination with a small percentage of an asymmetric aliphatic or cyclo-aliphatic diamine. This is apparent from examination of the fiber data in Examples 7, 9, 10, 11 and 12. This was unexpected in light of the strong negative effect the low unsaturation polyoxypropylene diol has on

TABLE 2

| Example | 6* | 7 | 8* | 9 | 10 | 11 | 12 |
|---|---|---|---|---|---|---|---|
| POLYOL | — | D | D | D | D | D | D |
| Equivalent % POLYOL D | 0 | 60 | 40 | 40 | 40 | 40 | 40 |
| Weight % POLYOL D | 0 | 60 | 40 | 40 | 40 | 40 | 40 |
| POLYOL | E | E | E | E | E | E | E |
| Equivalent % POLYOL E | 100 | 40 | 60 | 60 | 60 | 60 | 60 |
| Weight % POLYOL E | 100 | 40 | 60 | 60 | 60 | 60 | 60 |
| Molecular Weight of Overall POLYOL Blend | 2000 | 2000 | 2000 | 2000 | 2000 | 2000 | 2000 |
| NCO:OH | 1.65 | 1.70 | 1.65 | 1.65 | 1.65 | 1.65 | 1.65 |
| Prepolymer Viscosity, Pa · s (50° C.) | 51 | 18.1 | 29.2 | 29.2 | 29.2 | 29.2 | 29.2 |
| Prepolymer Catalyst | None | 50 ppm ZNO | 50 ppm ZNO | 50 ppm ZNO | 50 ppm ZNO | 50 ppm ZNO | 50 ppm ZNO |
| Amines: | | | | | | | |
| EDA, mole % | 95.0 | 82.5 | 95.5 | 80.5 | 80.5 | 80.5 | 80.5 |
| co-diamine, mole % | | 15% IPDA | 0 | 15% IPDA | 15% 1,2-PDA | 15% M-DACH | 15% Dytek |
| DEA, mole % | 5.0 | 2.5 | 4.5 | 4.5 | 4.5 | 4.5 | 4.5 |
| Polymer Solution: | | | | | | | |
| % Solids | 30 | 30 | 30 | 30 | 30 | 30 | 30 |
| Polymer Solution Viscosity @ 50° C., Pa · s | 59 | 89 | 87 | 67 | 75 | 73 | 59 |
| Spinning Speed (m/min.) | 420 | 420 | 420 | 420 | 420 | 420 | 420 |
| Fiber properties: | | | | | | | |
| Tenacity (cN/dtex) | 1.52 | 1.31 | 0.81 | 1.25 | 1.11 | 1.31 | 1.21 |
| Actual Tenacity[1] (cN/dtex) | 10.79 | 9.37 | 5.94 | 8.94 | 7.98 | 9.67 | 8.89 |
| % Elongation | 608 | 615 | 630 | 599 | 618 | 638 | 636 |
| 400% Modulus, cN/dtex | 0.326 | 0.216 | 0.229 | 0.228 | 0.218 | 0.223 | 0.212 |
| 5th Cycle Unload Power @ 150%, cN/dtex | 0.021 | 0.022 | 0.021 | 0.019 | 0.022 | 0.022 | 0.021 |
| Set, % | 15 | 21 | 24 | 16 | 18 | 16 | 18 |

*Comparative Example
[1]Same as Table I

As is well known, spandex based on a polyol component composed solely of PTMEG (no low unsaturation PPG), typically exhibits excellent properties as shown in Comparative Example 6. Key attributes of such PTMEG-based fibers include high tenacity and unload power and low set. One undesirable feature of such fibers demonstrated by the fiber produced in Comparative Example 6 is high modulus. High modulus leads to resistance to elongation and thus to discomfort in donning and wearing garments. Comparative Example 8 shows that a fiber produced with a polyol composition that includes 60 equivalent percent PTMEG-2000 and 40 equivalent percent of a 2000 MW low unsaturation polyoxypropylene diol exhibits low tenacity and high residual elongation or set. The tenacity only increased slightly relative to the fiber of Comparative Example 5 which contained no PTMEG in its polyol component.

Surprisingly it has been found that spandex fibers with excellent tenacity, retractive power and set can be produced tenacity and set as seen in Comparative Examples 5, 6 and 8.

In Comparative Example 8 and Examples 7, 9, 10, 11, and 12, the fibers produced were based on polyol compositions which included a 2000 MW PPG and a 2000 MW PTMEG. The presence of the asymmetric aliphatic or cycloaliphatic co-diamine dramatically increased tenacity while reducing set. As can be seen from the properties reported in TABLE 2, all other properties were substantially unchanged. This was contrary to the expectation that the properties of the spandex fibers would decrease as the percentage of PTMEG in the polyol component was reduced.

The spandex fiber produced in Example 7 was based on a polyol component containing only 40 equivalent percent PTMEG-2000 and 60 equivalent percent of a low unsaturation 2000 MW PPG. The excellent tenacity and unload power and low modulus shown by the spandex fiber produced in Example 7 demonstrates that even when low percentages of PTMEG are used in the polyol component, spandex with excellent properties can be obtained when prepared in accordance with the present invention.

Having now fully described the invention, it will be apparent to one of ordinary skill in the art that many changes and modifications can be made thereto without departing from the spirit or scope of the invention as set forth herein.

What is claimed is:

1. A segmented polyurethane/urea produced by reacting in solution:
   a) an isocyanate-terminated prepolymer having a free isocyanate group content of from about 1 to about 3.75% which is the reaction product of
      (1) a stoichiometric excess of at least one diisocyanate with
      (2) an isocyanate-reactive component comprising:
         (i) a diol component which comprises
            (a) from about 10 equivalent percent to about 70 equivalent percent of at least one polyoxypropylene diol having a molecular weight of at least 1500 Da and an average unsaturation level less than or equal to 0.03 meq/g, and
            (b) from about 30 equivalent percent to about 90 equivalent percent of at least one polytetramethylene ether glycol having a molecular weight of from about 600 Da to about 6000 Da; and, optionally,
         (ii) one or more other materials containing at least one functional group that is reactive with an isocyanate group, provided that the sum of the equivalent percents of (i) and (ii) is 100 equivalent percent, with
   b) a diamine chain extender comprising:
      (1) from about 7 to about 25 equivalent percent, based on total equivalents of b), of at least one asymmetric aliphatic and/or cycloaliphatic diamine and
      (2) at least one linear diamine in the presence of
   c) a solvent.

2. The polyurethane/urea of claim 1 in which from about 7 to about 20 equivalent percent of the diamine chain extender is an asymmetric aliphatic and/or cycloaliphatic diamine.

3. The polyurethane/urea of claim 1 in which from 10 to 15 equivalent percent of the diamine chain extender is an asymmetric aliphatic and/or cycloaliphatic diamine.

4. The polyurethane/urea of claim 1 in which ethylene diamine is the linear diamine.

5. The polyurethane/urea of claim 1 in which from about 10 to about 50 equivalent percent of the polyol component is a polyoxy-propylene diol having a molecular weight of at least 1500 Da and an average unsaturation level less than or equal to 0.03 meq/g.

6. The polyurethane/urea of claim 1 in which the polyoxypropylene diol having an average unsaturation level less than or equal to 0.03 meq/g has an average molecular weight of from about 2000 to about 8000 Da.

7. The polyurethane/urea of claim 1 in which the polyoxypropylene diol having a molecular weight of at least 1500 Da has an average unsaturation level of less than 0.02 meq/g.

8. The polyurethane/urea of claim 1 in which the diisocyanate is diphenylmethane diisocyanate.

9. A spandex fiber spun from the polyurethane/urea of claim 1.

10. A process for the production of spandex fiber comprising spinning a polyurethane/urea which is the reaction product of:
   a) an isocyanate-terminated prepolymer having a free isocyante group content of from about 1.0 to about 3.75% which is the reaction product of
      (1) a stoichiometric excess of a diisocyanate with
      (2) an isocyanate-reactive component comprising
         (i) a diol component comprising
            (a) from about 10 equivalent percent to about 70 equivalent percent of at least one polyoxypropylene diol having a molecular weight in excess of about 1500 Da and an average unsaturation level less than or equal to 0.03 meq/g, and
            (b) from about 30 equivalent percent to about 90 equivalent percent of at least one polytetramethylene ether glycol having a molecular weight of at least 600 Da; and, optionally,
         (ii) one or more other materials containing at least one functional group that is reactive with an isocyanate group, provided that the sum of the equivalent weight percents of (i) and (ii) is 100 equivalent percent, with
   b) a diamine chain extender comprising
      (1) from about 7 to about 25 equivalent percent, based on total equivalents of b), of an asymmetric aliphatic and/or cycloaliphatic diamine and
      (2) at least one linear diamine in
   c) a solvent.

11. The process of claim 10 in which the diisocyanate is diphenylmethane diisocyanate.

12. The process of claim 10 in which the linear diamine is ethylene diamine.

13. The process of claim 10 in which from 7 to 20 equivalent percent of the diamine chain extender is an asymmetric aliphatic and/or cycloaliphatic diamine.

14. The process of claim 10 in which from 10 to 15 equivalent percent of the diamine chain extender is an asymmetric aliphatic and/or cycloaliphatic diamine.

15. The process of claim 10 in which the solvent is dimethyl acetamide.

* * * * *